United States Patent [19]

Marsilio

[11] Patent Number: 5,083,913
[45] Date of Patent: Jan. 28, 1992

[54] MIX HEAD BUSHING SEAL

[75] Inventor: Ronald M. Marsilio, Mogadore, Ohio

[73] Assignee: American Standard Inc., New York, N.Y.

[21] Appl. No.: 688,414

[22] Filed: Apr. 22, 1991

Related U.S. Application Data

[63] Continuation-in-part of Ser. No. 499,188, Mar. 26, 1990, abandoned.

[51] Int. Cl.$^5$ .............................................. B29C 45/20
[52] U.S. Cl. .......................... 425/568; 425/DIG. 227
[58] Field of Search ............ 425/567, 568, 569, 570, 425/571, 572, 573, DIG. 227

[56] References Cited

U.S. PATENT DOCUMENTS

| | | | |
|---|---|---|---|
| 1,461,385 | 7/1923 | Falor | 285/332.2 |
| 3,052,925 | 9/1962 | Bronnenkant et al. | 425/571 |
| 3,070,846 | 1/1963 | Schrier | 425/447 |
| 3,718,166 | 2/1973 | Gordon | 425/570 |
| 3,837,777 | 9/1974 | Hunten et al. | 425/DIG. 227 |
| 3,915,610 | 10/1975 | Kohler | 425/568 |
| 4,043,740 | 8/1977 | Gellert | 425/DIG. 227 |
| 4,666,396 | 5/1987 | Shaw | 425/568 |
| 4,743,188 | 5/1988 | Gray | 425/569 |
| 4,747,770 | 5/1988 | Schmidt | 425/570 |
| 4,917,595 | 4/1990 | Nakamura et al. | 425/569 |
| 4,950,154 | 8/1990 | Moberg | 425/567 |

FOREIGN PATENT DOCUMENTS

| | | |
|---|---|---|
| 0022373 | 1/1981 | European Pat. Off. . |
| 0061972 | 10/1982 | European Pat. Off. . |
| 0289764 | 11/1988 | European Pat. Off. . |
| 0344381 | 12/1989 | European Pat. Off. . |
| 2595435 | 9/1987 | France . |
| 126463 | 6/1928 | Switzerland . |
| 428194 | 7/1967 | Switzerland . |
| 1365341 | 9/1974 | United Kingdom . |

Primary Examiner—Jay H. Woo
Assistant Examiner—Khanh P. Nguyen
Attorney, Agent, or Firm—Blum Kaplan

[57] ABSTRACT

A mix head bushing including a body portion having first and second ends. The body portion includes a flange extending radially outwardly from the first end thereof and an essentially conical passage extending therethrough to define a first opening at the first end of the body portion and a second smaller opening at the second end of the body portion. The body portion further includes a second flange having an inner edge extending radially inwardly partially over the second opening. A resilient coating is adhered to the body portion in the passage and extends inwardly beyond the inner edge of the second flange.

30 Claims, 7 Drawing Sheets

MIX HEAD BUSHING SEAL

CROSS-REFERENCE TO RELATED APPLICATION

This application is a continuation-in-part application of U.S. patent application Ser. No. 07/499,188, filed Mar. 26, 1990, now abandoned.

BACKGROUND OF THE INVENTION

The present invention is directed generally to a mix head bushing for facilitating the engagement of a mix head to a mold and, in particular, to an improved mix head bushing seal particularly adapted for use in connection with the application of a layer of plastic material to the underside a large sanitary fixture such as a tub or the like or of a small sanitary fixture such as a sink, lavatory or the like.

In manufacturing molded articles in a mold involving the injection of a polymeric material into the mold through a mix head, it is important that the mix head form an excellent seal with respect to the mold to prevent the drawing of air into the mold cavity and to prevent leakage. One such application involving the molding of a plastic material to the underside of a large sanitary fixture such as a tub or the like is described in parent application Ser. No. 07/499,188 filed on Mar. 26, 1990. This patent application discloses a mix head bushing particularly adapted for use with larger molds such as those used for bathtubs.

In the molding of a plastic material to the underside of a small sanitary fixture such as a sink, lavatory or the like, it has been found that the mix head bushing disclosed in the parent application was less than completely satisfactory because a smaller mix head is utilized. Merely scaling down the size of the mix head in the parent application proved unacceptable.

Accordingly, it is desired to provide an improved mix head bushing seal particularly adapted for use in connection with the molding large sanitary fixtures such as bathtubs and the like or of small sanitary fixtures such as sinks, lavatories and the like.

SUMMARY OF THE INVENTION

Generally speaking, in accordance with the present invention, a mix head bushing is provided. The mix head bushing includes a body portion having first and second ends including a first flange extending radially outwardly from the first end thereof. The body portion also includes an essentially conical passage extending therethrough to define a first opening at the first end of the body portion and a second smaller opening at the second end of the body portion. The body portion further includes a second flange having an inner edge extending radially inwardly partially over said second opening. A resilient coating is adhered to the inner surface of the body portion in the passage. The resilient coating extends inwardly beyond the inner edge of the second flange.

In a preferred embodiment, the first flange includes a plurality of through holes therein, with a portion of the walls defining each through hole extending into the passage in the body portion. The inner surface of the body portion defining the passage therein further preferably includes a recess therein adjacent the second flange, with the resilient coating extending into the recess to anchor the coating in the passage.

Accordingly, it is an object of the present invention to provide an improved mix head bushing seal.

Another object of the present invention is to provide a mix head bushing seal particularly adapted for use in connection with the molding of large and small sanitary fixtures.

Another object of the present invention is to provide a mix head bushing seal which provides an excellent seal between a mix head and a mold.

Yet another object of the present invention is to provide an improved mix head bushing seal particularly adapted for use in a mold used to coat the undersurface of a small sanitary fixture with a plastic coating.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENT

As fully described in parent application Ser. No. 07/499,188, a mix head bushing seal is provided for engagement with a mix head as the mix head injects a polymeric material into a mold. The bushing is attached to the mold when in use. The mix head, which has a head configuration corresponding to the inner configuration of the mix head bushing seal, is inserted within the mix head bushing seal and sealed thereagainst. It is important that an excellent seal be formed between the mix head and the mix head bushing seal so that air is not drawn into the mold during the injection of the polymeric material and to otherwise prevent leakage of such material. The mixture of air with the injected, hardenable material causes the production of defective products.

In general, when applying a coating of plastic material to the underside of a large sanitary fixture such as a tub or the like, the mix head utilized is larger than the mix head used for molding small sanitary fixtures such as sinks, lavatories and the like. Merely scaling down the size of the bushing disclosed in the above-referenced patent application to accommodate a smaller mix head proved unacceptable.

Figure 1:
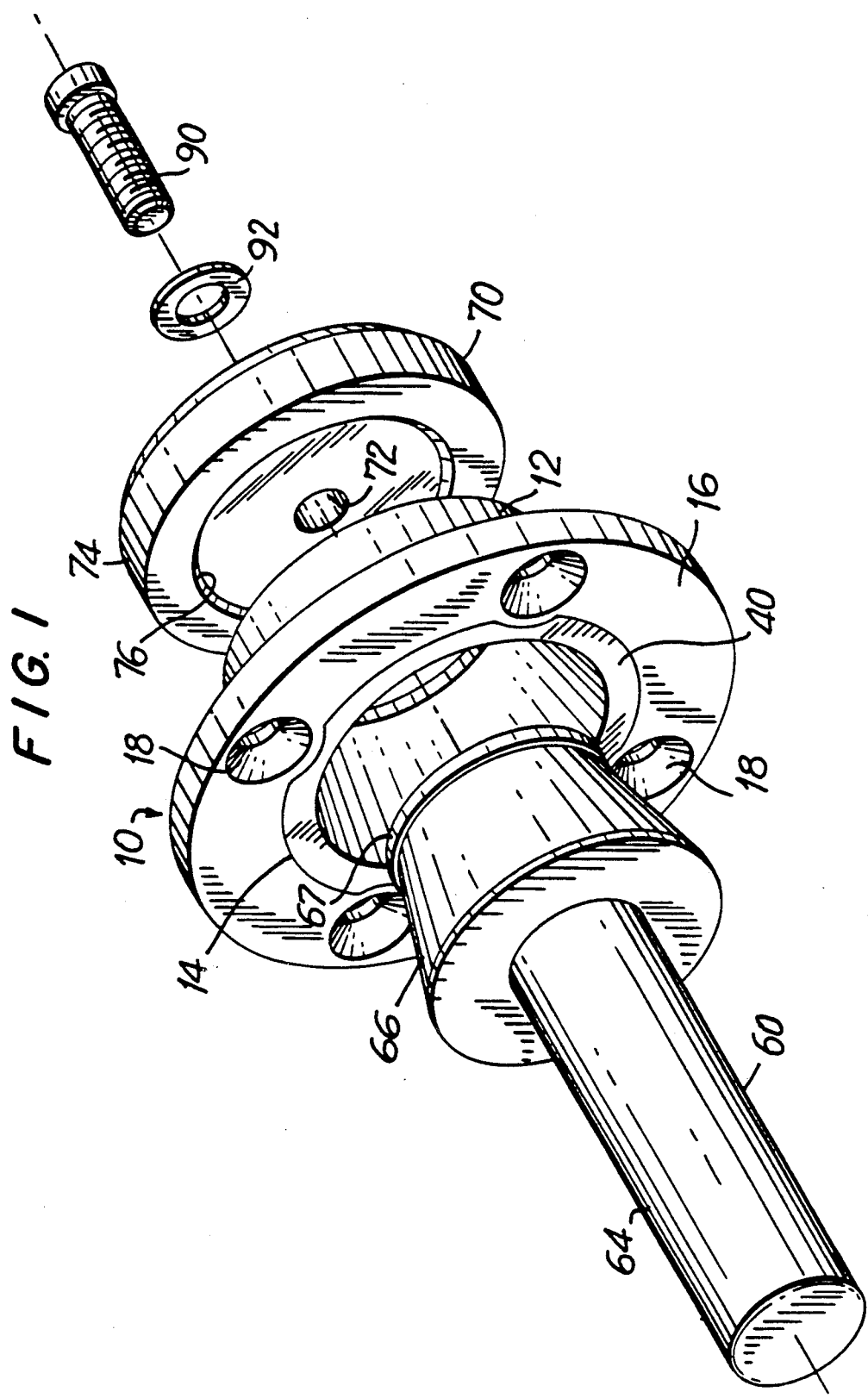
FIG. 1 is an exploded perspective view of a mix head bushing seal and fixturing assembly for allowing an elastomeric coating to be applied to the inner surface of the mix head bushing seal, constructed in accordance with a preferred embodiment of the present invention.
Figure 2:
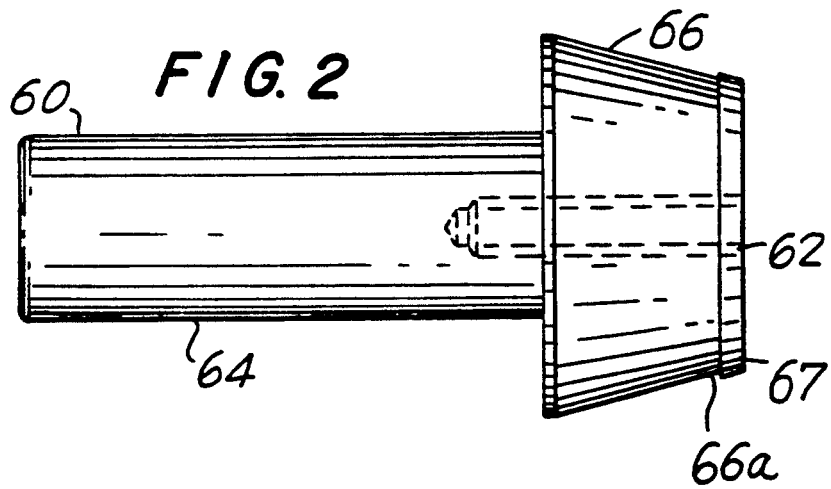
FIG. 2 is a side elevational view of the molding plug depicted in FIG. 1.
Figure 3:
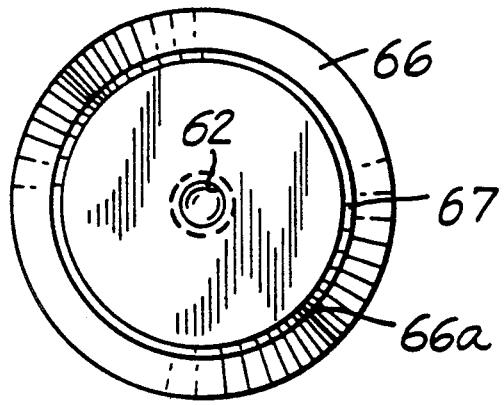
FIG. 3 is a front plan view of the molding plug depicted in FIG. 2.
Figure 4:
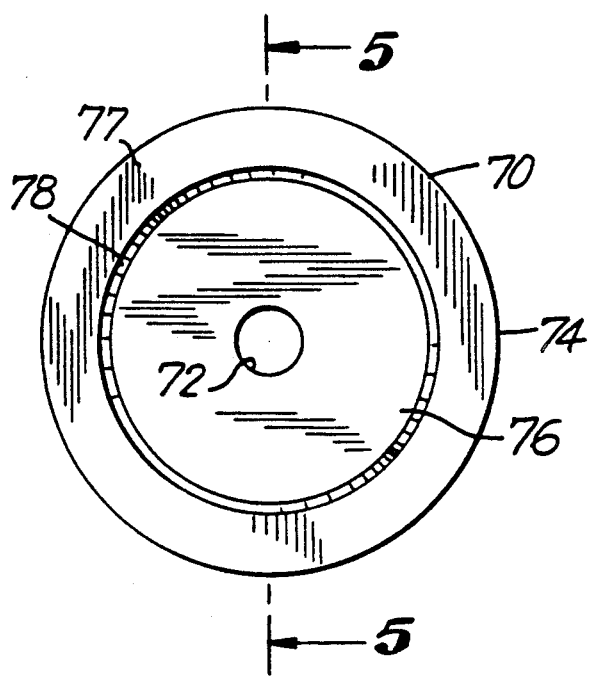
FIG. 4 is a rear plan view of the molding cap depicted in FIG. 1.
Figure 5:
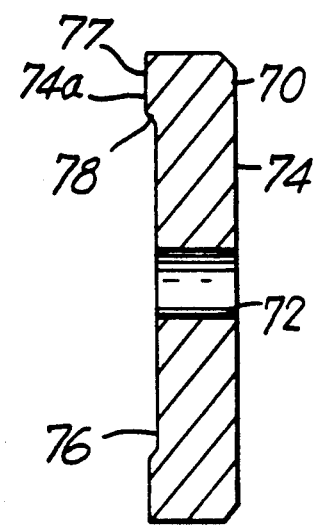
FIG. 5 is a sectional view taken along the line of 5—5 of FIG. 4.
Figure 6:
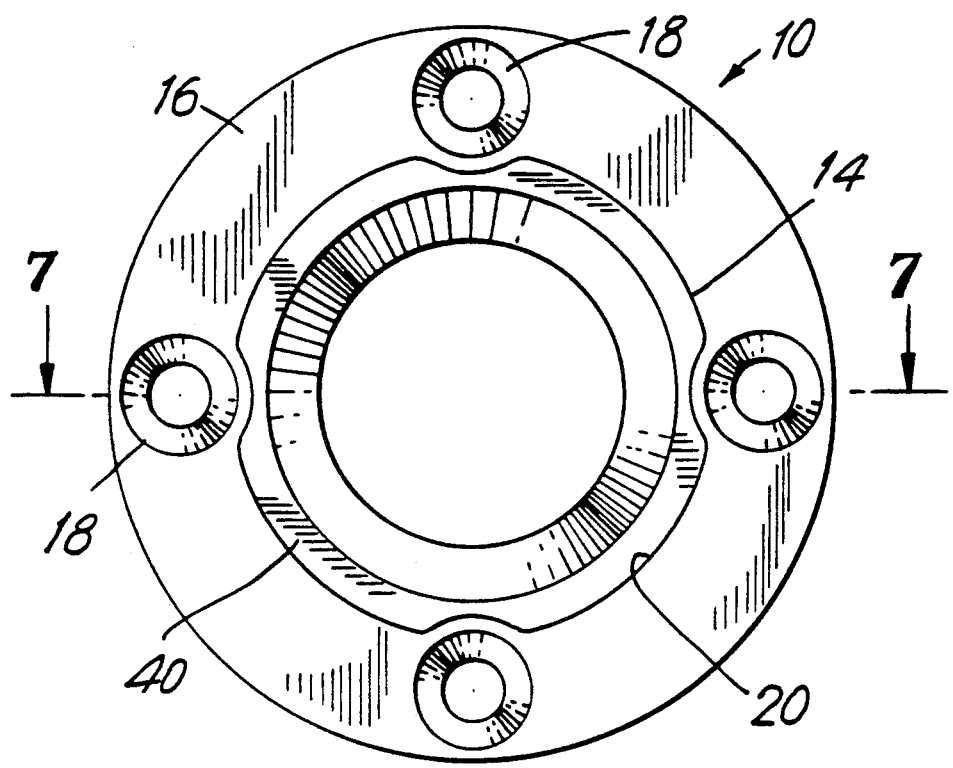
FIG. 6 is a rear plan view of the mix head bushing seal depicted in FIG. 1.
Figure 7:
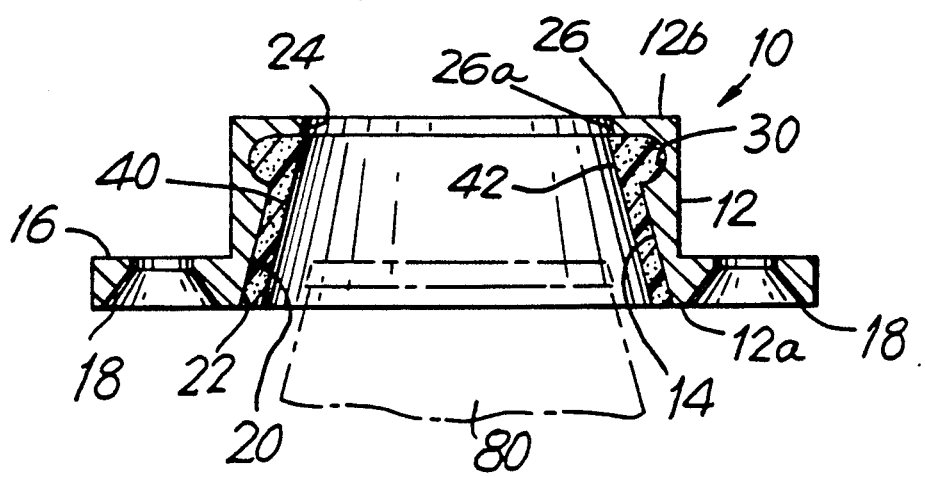
FIG. 7 is a sectional view taken along line 7—7 of FIG. 6, and showing a mix head in phantom partially inserted therein.

Reference is first made to FIGS. 1, 6 and 7 which depict a mix head bushing seal, generally indicated at 10, having a body portion 12 including an inner wall 14. Body portion 12 is preferably formed from an aluminum alloy 6061-T6 which is an aircraft grade aluminum alloy according to ASTM specifications. However, it is noted, that body portion 12 of mix head bushing seal 10 may also be formed of a cold rolled steel material.

Body portion 12 includes an annular flange 16 extending radially outwardly therefrom. Flange 16 includes four chamfered screw holes 18 therethrough spaced 90° apart from one another. Holes 18 are used with appropriate screws to fix mix head bushing seal 10 to a mold.

Bushing seal 10 includes a passage or through opening 20 defined by inner wall 14. Passage 20 is essentially conical in shape wherein inner wall 14 is inclined at an angle of about 15° to the central axis of the body extending from a larger opening 22 at first end 12a of body 12 to a smaller opening 24 provided at second end 12b of body 12. It is noted that body 12 includes a second flange 26 which extends radially inwardly from body portion 12 at second end 12b. Second flange 26 extends partially over second opening 24 in body 12. Inner wall 26a of second flange 26 is also inclined in the same direction as inner wall 14 of body 12 at about 15°.

An annular recess in the form of a groove 30 is formed within inner wall 14 of body portion 12 adjacent second flange 26 as best depicted in FIG. 7. Groove 30 may be semicircular in cross-section as depicted. Groove 30 acts to retain a polymeric coating 40 on inner wall 14 of body portion 12, as a mix head 80, shown in phantom in FIG. 7, is inserted and withdrawn from conical passage 20.

Coating 40, which should be at least about one quarter of an inch in thickness, is applied to inner wall 14 of body 12 using the additional fixturing components shown in FIGS. 1 through 5. Such a thickness insures that sufficient resiliency is provided. Outer surface 42 of coating 30 extends at about the same 15° angle with respect to the central axis of body portion 12 as does inner wall 14 and inner wall 26a of flange 26.

The fixturing components include a molding plug 60 and a molding cap 70. Molding plug 60 and molding cap 70 may be secured to one another by a head cap screw 90 which extends through a flat washer 92, through opening 72 in molding cap 70 and then is threaded in opening 62 of molding plug 60.

Referring to FIGS. 1 through 5, it is seen that molding plug 60 includes a cylindrical body 64 having a generally conical head 66. The smaller end 66a of conical head 66 includes a rim 67 which projects radially slightly beyond the outer surface thereof. Threaded bore 62 extends through conical head 66 into cylindrical body portion 60. Bore 62 is coaxial with the longitudinal axis of molding plug 60.

Molding cap 70 includes a substantially cylindrical body 74 having an axial bore 72 extending therethrough. A first end 74a of cylindrical body 74 includes a shallow recess 76 which is defined in part by an annular rim 77. A bevel 78 of about 45° is formed between rim 77 and recess 76.

As described in detail in parent application Ser. No. 07/499,188, mix head bushing seal 10 is locked into position between molding plug 60 and molding cap 70, whereafter a molten polymeric material is poured into the conical recess formed between inner wall 14 of body portion 12 and the outer surface of conical head portion 66 of molding plug 60. The seal material is preferably a polyurethane elastomer such as Ren Co-Thane polyurethane elastomer 60-65A. Conical head portion 66 of molding plug 60 is sized to permit a portion of coating 40 to extend beyond edge 26a of second flange 26 as best depicted in FIG. 7. The extent of the projection of coating 40 beyond edge 26a of second flange 26 is about 0.030". This construction provides a better seal when mix head 80 compresses coating 40 during use.

It is also noted that the walls of flange 16 defining bore holes 18 extend partially into passage 20 as best depicted in FIGS. 1, 6 and 7 to provide adequate support for bore holes 18.

The mix head bushing is employed in a molding apparatus as fully described in parent application Ser. No. 07/499,188. The improved mix head bushing seal of the present invention provides an appropriately sized and constructed bushing seal for use in molding small sanitary fixtures such as sinks, lavatories and the like. A superior seal between the mix head and the mold is provided and the construction provides distinct benefits and advantages as more fully detailed hereinabove.

Figure 8:
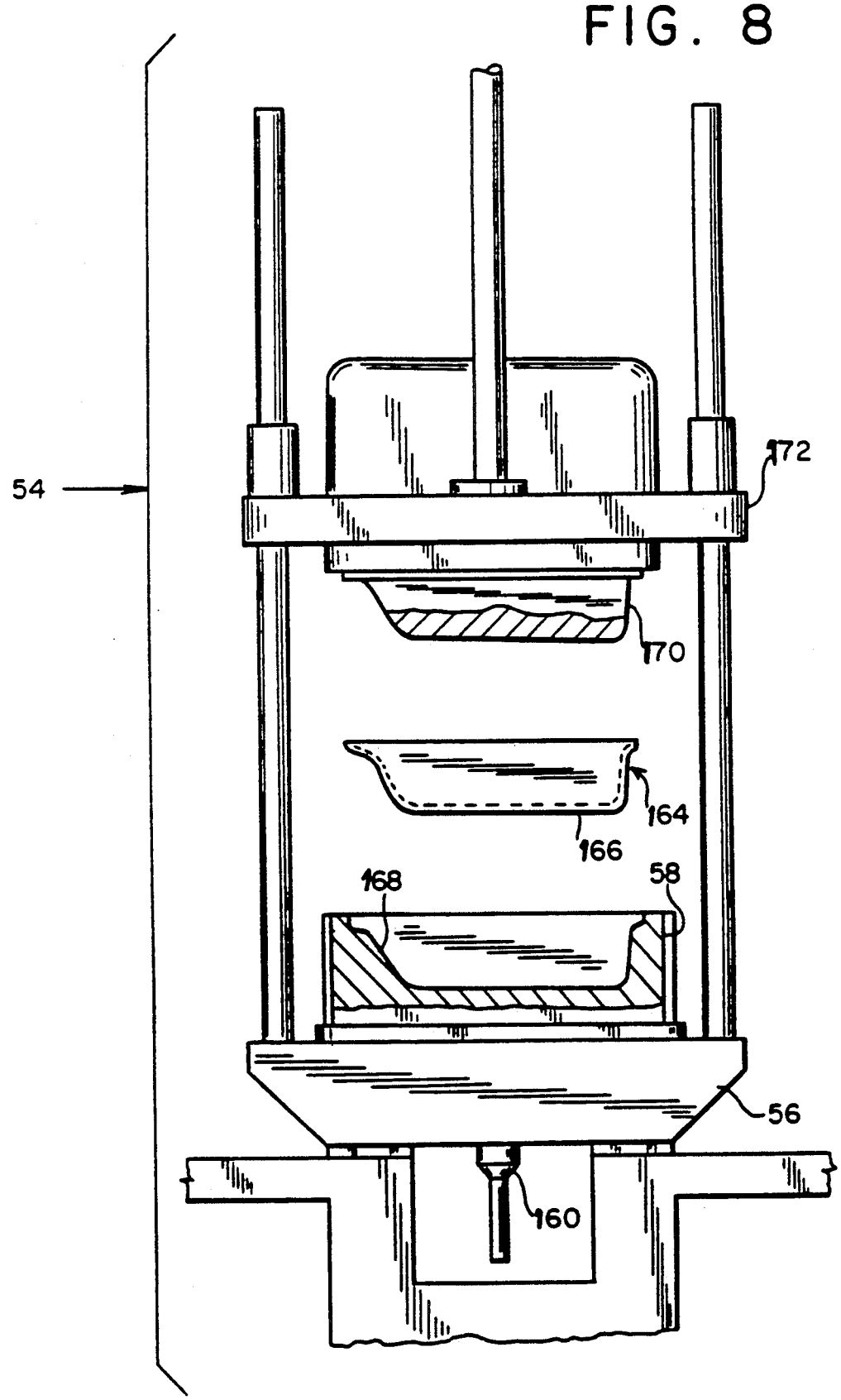
FIG. 8 is a front elevational schematic view of a molding apparatus.
Figure 9:
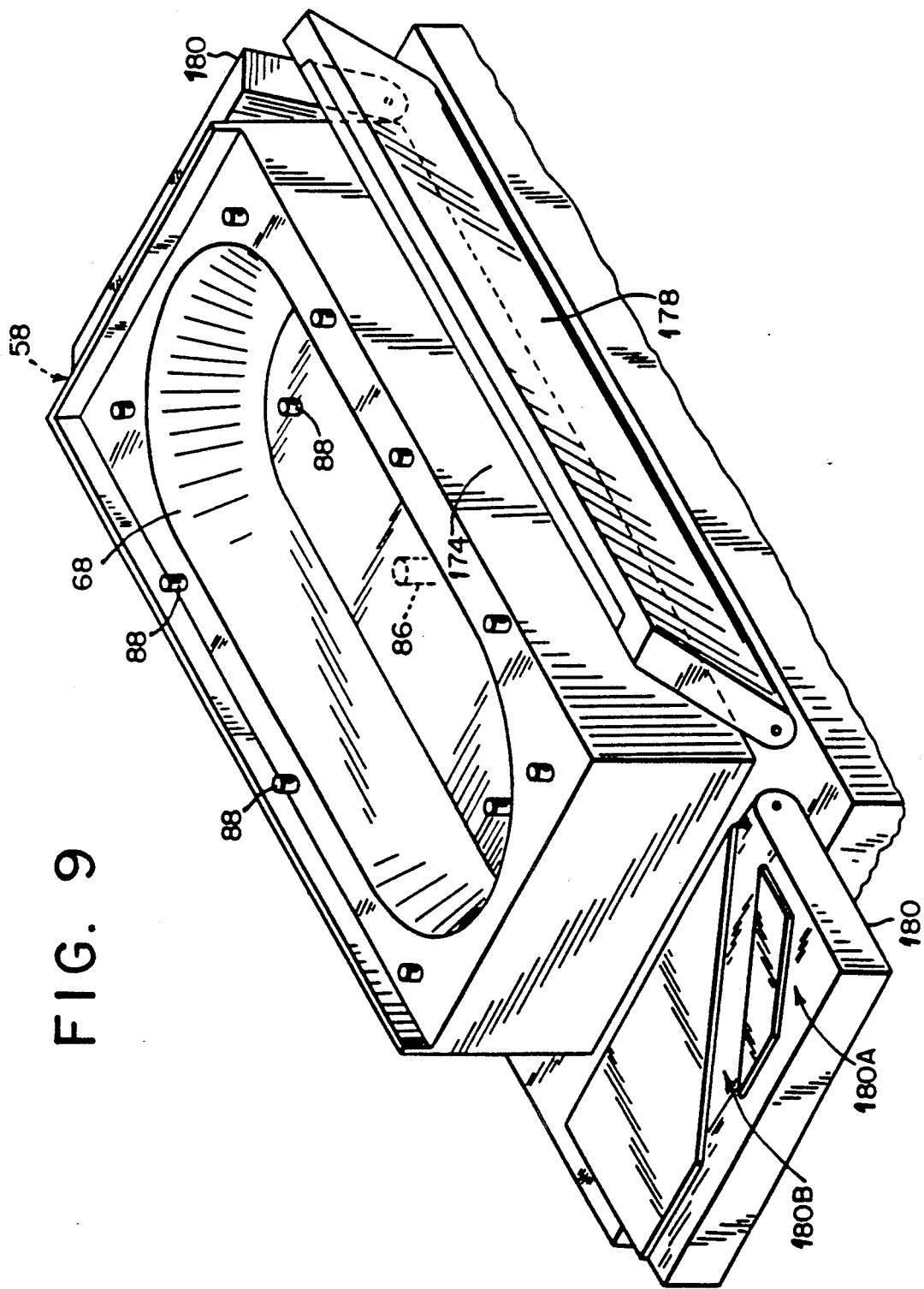
FIG. 9 is a perspective view of a mold receptor.
Figure 10:
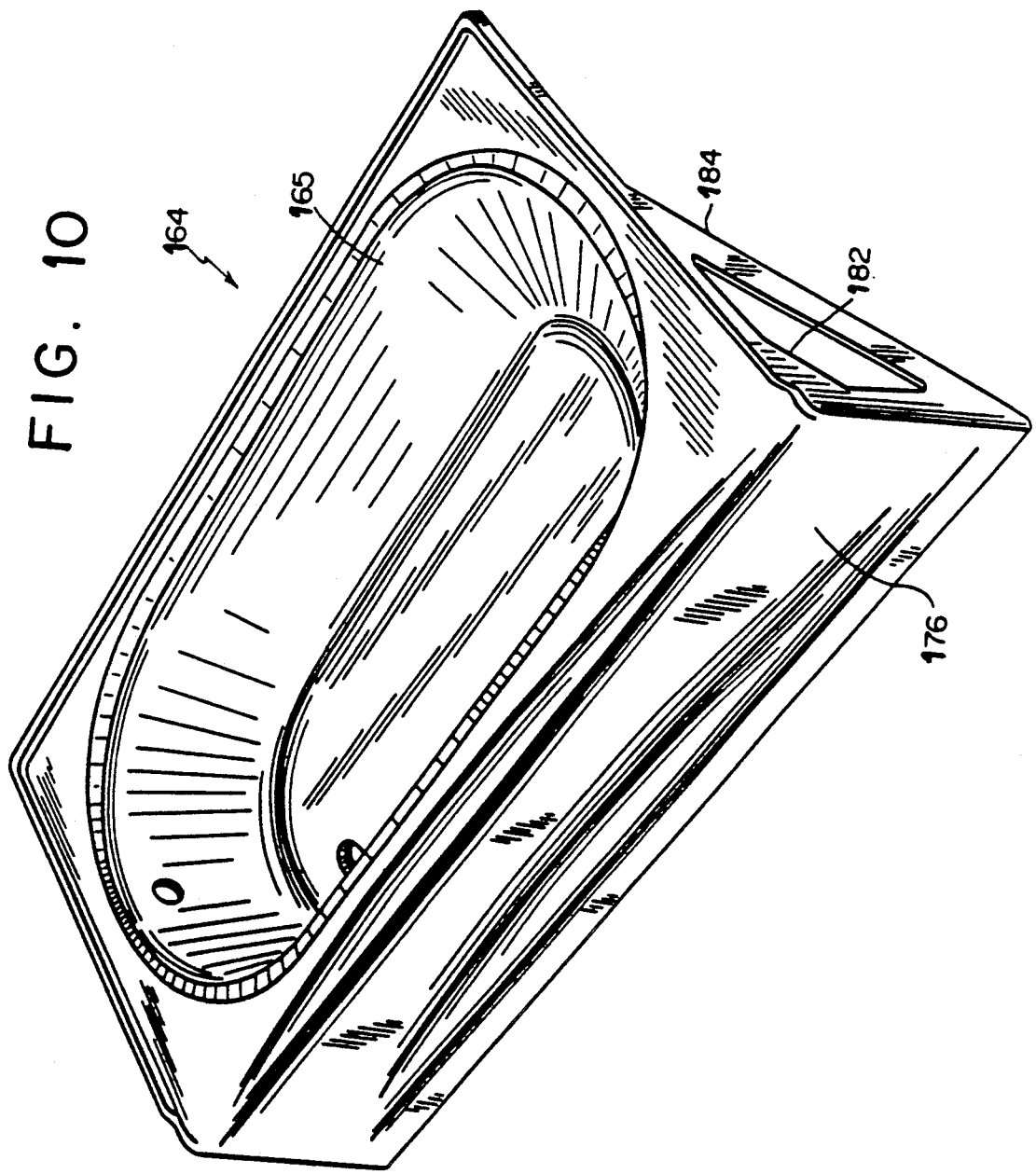
FIG. 10 is a top perspective view of a bathtub shell.
Figure 11:
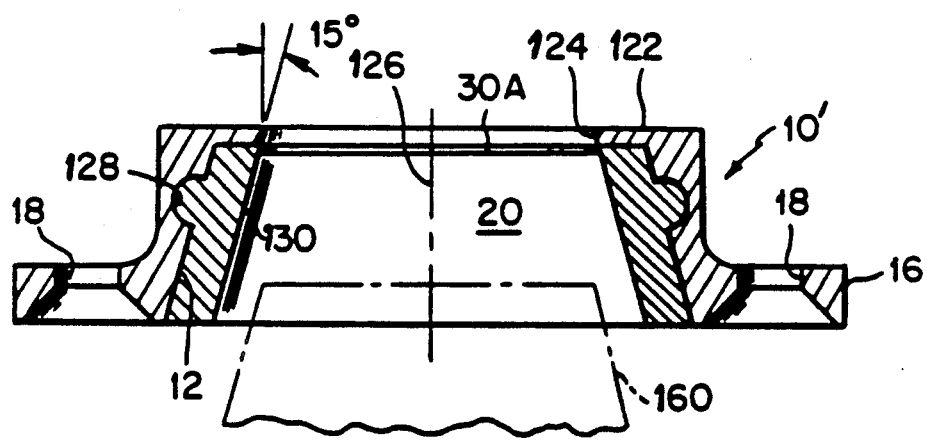
FIG. 11 is a sectional view, similar to FIG. 7, showing an alternative embodiment of the mix head bushing seal used for large sanitary fixtures.

Reference is now made to FIGS. 8 through 11 to explain the manner in which a mix bushing seal 10' is used during manufacture of a large sanitary fixture such as a bathtub. For large sanitary fixtures such as a bathtub, a mix head bushing 10' (FIG. 11) may be employed in a molding apparatus 54 as shown in FIG. 8. Apparatus 54 includes a platform 56 onto which a mold receptor 58 is mounted. A mix head 160 is positioned below platform 56 for injecting polymeric foam through a conduit in platform 56 and into the mold receptor 58. Mix head 160 (or 80 in FIG. 7) includes a tapered end, as shown in FIGS. 7 and 11. The tapered end of the mix head is inclined at the same angle with respect to the axis 126 of the mix head bushing as the surfaces of the coating 130 and the inner edge 24 of the inwardly extending flange 122. Mold receptor 58, shown in FIG. 8, is adapted for receiving a bathtub shell 164, leaving a void between the non-finish side 166 of the shell and the upper face 168 of mold receptor 58. The bathtub shell 164 is placed within the mold receptor with its apron 176 (FIG. 10) positioned along the front mold receptor face 174.

A male mold closing member 170 has a rubbery elastomeric surface which fits snugly within the bathtub shell 164 on the finish side 165 thereof, sealing the shell 164 to the mold receptor 58 and forming a closed cavity between the mold receptor face 168 and the shell's non-finish side 166. The closing member 170 also helps to minimize warp, bowing and distortion of the bathtub shell 164 during the injection molding process.

A hydraulically operated system 172 lowers and retains the male mold closing member 170 against the bathtub shell 164 and mold receptor 58 during the molding process. As illustrated in FIGS. 8–10, mold receptor 58 includes a mold receptor face 174 for forming a void between it and the nonfinish side of the bathtub shell apron 176. Mold receptor 58 also includes a front apron door 178 which is covered with an elastomeric material to sealably engage and hold apron 176 of the bathtub shell to the mold receptor 58 during the injection molding process. Two side doors 180, each covered with elastomeric material are also incorporated as parts of mold receptor 58. Each includes channels 180A and 180B for molding of the polymeric foam surrounding the small brace 182 and a relatively large brace 184, respectively, within the finished product. As with the apron door 178, side doors 180 sealably engage and hold the bathtub shell to the mold receptor 58 during the injection molding process.

An aperture 86 in the mold receptor 58 communicates with mix head 160 for introducing the hardenable polymeric foam into the void between the mold receptor face 68 and the bathtub shell 164. Mix head bushing 10' is mounted to the mold receptor 58 such that the passage 20 is aligned with this aperture 86.

A plurality of ejectors 88 are positioned in the mold receptor 58 and serve to separate and eject the molded bathtub from the mold receptor 58 after the molding process has been completed. Preferably, the ejectors are cylindrical rods which are hydraulically activated from a recessed position to an ejected position (shown in FIG. 9) and vice versa.

In operation, a bathtub shell 164 is positioned within the mold receptor. The bathtub shell is preferably constructed from steel which has been coated with enamel at least on the finish side 165 thereof. The shell 164 sealingly engages the mold receptor 58 by lowering the male mold closing means 170. The two side doors 180 are closed to form sealed molding channels about the small and large braces 182, 184 of the shell. The front door 178 sealably engages the finish side of the apron 176 and seals against the rim of the male mold closing means 170.

The hardenable polymeric foam is introduced from the mix head 160 through the aperture 86 in the bottom of the mold receptor 58. The mix head bushing 10, being secured to the bottom of the mold receptor 58 by screws or bolts extending through the holes 18 in the flange portion 16 thereof, allows the tapered end of the mix head 160, as shown in FIG. 11, to sealingly engage and slightly compress the conical inner surfaces of the mix head bushing defined by the polyurethane elastomeric coating 130. The inclined inner edge 124 of the inwardly extending flange 122 is also engaged by the mix head upon full insertion within the passage 20. Such a seal will be formed even if the mix head is slightly misaligned or worn. This allows the foam to be injected without the danger of drawing air within the molding cavity.

Once the foam has curved, the front and side doors 178, 180 are opened and the male mold closing member 170 retracted. The molded bathtub, which is formed by the shell and the hardened foam adhered thereto, is lifted partially out of the mold receptor 58 by the hydraulic ejectors 88. It may then be removed entirely from the receptor by manual or mechanical means. The mix head bushing 10 may be removed from the mold receptor and cleaned. The inwardly extending flange 122 protects the polyurethane elastomer coating 130 as the top surface of the bushing is scraped clean.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A mix head bushing comprising a body portion having first and second ends including a first flange extending radially outwardly from said first end thereof, said body portion having an essentially conical passage extending therethrough to define a first opening at said first end of said body portion and a second smaller opening at said second end of said body portion, the body portion further including a second flange having an inner edge extending radially inwardly partially over said second opening, and a resilient coating adhered to said body portion in said passage, said resilient coating extending inwardly beyond the inner edge of said second flange.

2. The mix head bushing as claimed in claim 1, wherein said first flange includes a plurality of through holes therein, a portion of the wall defining each said through hole extending into said passage of said body portion.

3. The mix head bushing as claimed in claim 1, wherein said body portion includes an inner surface adjoining said resilient coating, said inner surface including a recess therein adjacent said second flange, said resilient coating extending into said recess to anchor said coating in said passage.

4. The mix head bushing as claimed in claim 1, wherein said resilient coating is formed from a polyurethane elastomer.

5. The mix head bushing as claimed in claim 1, wherein said body portion is formed from one of aluminum or cold rolled steel.

6. The mix head bushing as claimed in claim 1, wherein said resilient coating is at least about one quarter of an inch thick.

7. A mix head and mix head bushing assembly comprising a mix head having a conically shaped head, and a mix head bushing including a body portion having first and second ends including a first flange extending radially outwardly from the first end thereof, the body portion having an essentially conical passage extending therethrough to define a first opening at said first end of said body portion and a second smaller opening at the second end of the body portion, said essentially conical passage in said body portion corresponding essentially in shape and size to said conical head of said mix head, said body portion further including a second flange having an inner edge extending radially inwardly partially over said second opening, and a resilient coating adhered to said body portion in said passage, said resilient coating extending inwardly beyond the inner edge of said second flange and being compressed by said conical head of said mix head when said mix head is inserted in said passage.

8. The mix head and mix head bushing assembly as claimed in claim 7, wherein said first flange includes a plurality of through holes therein, a portion of the wall defining each said through hole extending into said passage and said body portion.

9. The mix head and mix head bushing assembly as claimed in claim 7, wherein said body portion includes an inner surface adjoining said resilient coating, said inner surface including a recess therein adjacent said second flange, said resilient coating extending into said recess to anchor said coating in said passage.

10. The mix head and mix head bushing assembly as claimed in claim 7, wherein said resilient coating is formed from a polyurethane elastomer.

11. The mix head and mix head bushing assembly as claimed in claim 7, wherein said body portion is formed from one of aluminum or cold rolled steel.

12. The mix head and mix head bushing assembly as claimed in claim 7, wherein said resilient coating is at least about one quarter of an inch thick.

13. A mix head bushing comprising:
   a body portion including a first flange extending radially outwardly therefrom, said body portion including a first opening on a first side thereof and a second smaller opening on a second side thereof;
   a passage extending through said body portion from said first opening to said second smaller opening defining an inner surface of said body portion, said passage being substantially conical throughout at least part of its length;
   a second flange extending inwardly from said second side of said body portion to partially cover said second smaller opening; and
   a resilient coating adhered to the inner surface of said body portion, said resilient coating abutting against said second flange.

14. A mix head bushing as described in claim 13 wherein said passage is substantially conical throughout its length.

15. A mix head bushing as described in claim 13 wherein said second flange is annular and extends partially over said passage.

16. A mix head bushing as described in claim 15 wherein said second flange includes an outer perimeter which is substantially coextensive with the outer surface of said body portion.

17. A mix head bushing as described in claim 16 wherein said inner surface includes a recess therein, said resilient coating extending within said recess.

18. A mix head bushing as described in claim 17 wherein said recess is an annular groove.

19. A mix head bushing as described in claim 17 wherein said resilient coating is comprised of a polyurethane elastomer.

20. A mix head bushing as described in claim 13 wherein said resilient coating is comprised of a polyurethane elastomer.

21. A mix head bushing as described in claim 20 wherein said resilient coating is at least one quarter of an inch thick.

22. A mix head bushing as described in claim 13 wherein said resilient coating is at least one quarter of an inch thick.

23. A mix head and bushing assembly comprising:
   a mix head including a tapered end; and
   a mix head bushing, said mix head bushing including a body portion, a passage extending through said body portion, said passage being substantially conical throughout at least part of its length, a resilient coating adhered to said body portion, said body portion including an inwardly extending flange partially covering said passage, said resilient coating abutting against said flange, said resilient coating having a thickness of at least about one quarter inch, said tapered end of said mix head being positioned within said passage.

24. An assembly as described in claim 23 wherein said flange extends over an end of said passage.

25. An assembly as described in claim 24 wherein said flange includes an inner edge extending at substantially the same angle as said tapered end of said mix head.

26. An assembly as described in claim 25 wherein said tapered end of said mix head engages said inner edge of said flange and compresses said resilient coating when fully inserted within said passage.

27. An assembly as described in claim 26 wherein said body portion includes an annular groove, said coating extending within said annular groove.

28. An assembly as described in claim 26 wherein said coating includes a polyurethane elastomer.

29. An assembly as described in claim 23 wherein said mix head bushing includes a flange extending radially outwardly from said body portion.

30. An assembly as described in claim 24 wherein said mix head bushing includes a flange extending radially outwardly from said body portion.

* * * * *